United States Patent Office 2,821,410
Patented Jan. 28, 1958

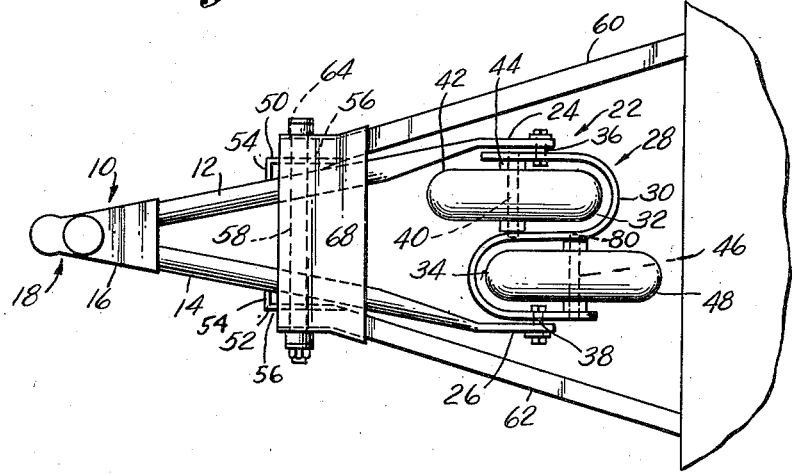

2,821,410

TRAILER HOUSE DOLLY

Richard R. Love, Buhl, Idaho

Application September 10, 1954, Serial No. 455,176

3 Claims. (Cl. 280—476)

This invention relates to a trailer house dolly for use in guiding and supporting trailers.

An object of this invention is to provide an easy riding, strong and inexpensive, serviceable, dolly for trailers.

It is also an object of my invention to provide a trailer dolly which when used in conjunction with a trailer will permit backing and maneuvering with the same ease as if the trailer were directly mounted. This is accomplished by providing a dolly which is longitudinally rigid in that the wheels and dolly frame do not pivot about a vertical axis with respect to the trailer.

One of the objects of the invention is to provide a dolly which is rigid longitudinally. This is an important safety feature. For example, in case the brakes of the towing vehicle are applied quickly there is no possibility of the inertia of the trailer causing the trailer to jack-knife or force the dolly sideways which usually results in a trailer accident.

A further object is to provide a unique wheel arrangement for dollies. According to the invention a stepped or longitudinally separated arrangement of wheels are provided on the dolly. The wheels are rigidly interconnected. One of the objects attained by the provision of a special wheel construction described hereinafter is the reduction of the tendency of trailers to sway.

Another object which is accomplished is to provide a generally steadier trailer supporting system for supporting one end of a trailer.

A still further object of the invention is to provide a special wheel system for a trailer dolly which has rigidity, yet which is also extremely simple in construction. The wheel system is designed so that it will withstand the strains of turning as in guiding a house trailer around curves or in backing up.

Other objects of my invention are to provide a trailer dolly with the smooth riding qualities of an oscillating tandem axle construction, to obtain smooth riding without the toss and sway of a spring mounted dolly, to eliminate continuous trouble with spring mountings, to eliminate the hazards resulting from broken springs, and in general to provide a safe, simple and easy to handle dolly.

Still other objects of the invention include the provision of a trailer hitching arrangement including a dolly frame which is pivotal about a horizontal axis and affixed to one end of a trailer frame. The dolly frame has a hitch at one end and a unique arrangement of supporting wheels at its opposite end.

These and other objects and advantages will become apparent from the following description and the accompanying drawings in which:

Figure 1 is a top plan view of a trailer house dolly constructed in accordance with the invention as connected to a trailer.

Figure 2 is a side elevational view thereof.

Figure 3 is a view taken along line 3—3.

Figure 4 is a fragmentary view showing a portion of the dolly construction.

Similar reference characters in the several figures indicate similar parts.

Referring now in particular to the drawings the dolly is indicated by reference character 10. The dolly comprises spaced side frame members 12 and 14. These members are connected at one end by a hitch support and jack base 16. The hitch 18 is connected to the forward end of the hitch and jack support 16, and a jack can be applied to the base 20. The opposite end of the side frame members are spaced as seen at 22 and they are provided with spaced parallel sections 24 and 26. These sections are adapted to receive a unique wheel arrangement 28. The latter comprises a unitary S-frame member 30 formed of a single piece of metal bent to the shape indicated. This member has two pockets 32 and 34 which can be referred to as wheel receiving or retaining pockets. The S-member is connected to the parallel projections 24, 26 by pivot bolts 36, 38. These can be provided with heads, cotter pins, bearings, etc. The bearings can be mounted in the S-frame members or in the side frame members.

A first shaft 40 is connected to spaced parallel legs of the S-frame member. This shaft supports a first wheel 42. Spacers 44 position the wheel centrally of the pocket 32. The shaft 40 is fixedly secured to the S-frame and tapered roller bearings are used on each side of the wheel, thus providing a strong assembly. The second shaft 46 is secured to the two spaced parallel S-frame members in a manner similar to the first shaft. Wheel 48 is supported on the second shaft. The axles 40 and 46 are spaced on opposite sides of the pivotal axis of connection of the S-frame to the side frame members. The first wheel 42 is pivotal about an axis longitudinally spaced to one side of the axis of pivotal connection of the S-frame to the side frame members. Wheel 48 is pivoted on an axis longitudinally spaced to the opposite side of the axis of pivotal connection of the S-frame to the side frame members.

Shaft supports 50, 52 are rigidly connected to the side frame members adjacent their centers. These supports include plates 54 and 56. Plates 56 extend parallel to projections 24 and 26. Sleeve 57 rigidly connects to plates 54—56. Shaft 58 is rigidly supported in side frame members 12 and 14 and plates 56. Shaft 58 extends parallel to axles 40, 46 and 36, 38. The trailer has spaced frame members 60 and 62 which extend roughly parallel to frame members 12 and 14. Frame members 60, 62 are affixed to the trailer and at their forward ends have spaced parallel legs 64, 66. A U-shaped support strap 68 is rigidly connected to the members 60, 62, adjacent the forward ends of the latter members. The U-shaped strap is in intimate contact with the legs 64, 66. This support strap has depending legs 69 which pivotally receive shaft 58. The shaft can be provided with nuts and cotter pins for retaining it in position.

The supports 50 and 52 cooperate with the depending legs 69 of the U-shaped frame member to keep the dolly centered. Rub plates for spacing collars 70 can be used to position the dolly and prevent undue wear. In other words, the plates 56 and the depending leg 69 can have additional plate members connected thereto to bear the wear and maintain the dolly in proper position between the members 60 and 62, or the collars 70 illustrated in Fig. 3 can be used.

Figure 4 illustrates the details of construction of the shafts 40, 46 and their connection with the wheels and S frame. It is seen in Fig. 4 that shaft 46 comprises a tubular cylindrical member having steps for receiving bearings 71, 72 which cooperate with suitable races on the shaft and in the wheel hub. Grease retainers such as 74 are also used and seat on collars 76. These collars closely fit the shaft 46 and serve to space the bearings and thus the wheel from the S-frame member 30. Shaft 46 has a flat sheet metal head 78 at one end which is received within the S-frame. At its opposite end the shaft is threaded as at 80 and threadingly engage the S-frame. A flat sheet metal head is used to reduce the space between the S-frame and the dolly frame side members. The flat sheet metal head is welded to the shaft or bolt 46. When the bearings 82 and bolts 36 are removed from the S-frame, head 78 can be rotated to engage shaft 46 with the frame member 30. When the shaft is fully inserted the head 78 is bent over as indicated at 84.

The thread 80 is a fine thread. The axles or bolts 40 and 46 serve not only as a means of connecting the wheels, but also support and strengthen the S-frame. Furthermore, they hold and adjust the tapered roller, wheel bearings, or other bearings used. The S-frame ends can flex to facilitate the bearing adjustment. As the axles are screwed further in the S-frame the end of the S-frame will abut against the collar 76 and adjust the wheel bearings. When bent over the square end of the S-frame the sheet metal heads of the shaft form a lock for the shaft and a shield for the forward end of the S-frame preventing it from hooking onto weeds, wire, etc. This also will function to scrape mud from the wheel.

The unique dolly construction has many advantages. In particular it adds increased stability to the trailer. The effect of road obstructions and depressions is minimized by the stepped arrangement of the wheels. The wheels 42 and 48 follow the contour of the ground, but the frame ends 24 and 26 will move in vertical planes only approximately half the distance of the wheels. This half movement is effected in the same period of time as the wheels require to travel the full distance. Thus, both the amount and speed of vertical motion of ends 24 and 26 are reduced. Assuming this reduction to be one-half, it may be said that the ride is four times as smooth. Furthermore, each bump is absorbed by two tires instead of one. This design of dolly is exceptionally smooth riding even over rough country roads. Of particular importance is the fact that there is much greater stability when turning the trailer or going around a curve. As an additional advantage the construction provides leverage for raising and lowering the forward end of the trailer. A most important advantage of the construction disclosed is the absence of springs. This not only increases stability, but obviously reduces cost and maintenance and results in a much safer trailer dolly construction.

The S-frame construction is extremely simple, yet it is (of necessity) a very rigid and strong construction. The shafts 40 and 46 interconnect the legs of the S-frame and greatly increases its stability. These are in reality no unsupported free ends of the frame. The rigid construction thus provided can withstand considerable strain. It is to be noted that there is a skidding of the tires slightly sidewise when turning a curve. This necessity for skidding the wheels in order to turn produces a stability in forward movement which is not obtained with a castering or more flexible design. The construction of the S-frame is strong enough to withstand skidding and the tires are not adversely affected. Experience has shown that there is no greater wear on the tires than in the case of the front tires of automobiles which are constantly skidding sideways.

While I have shown and described a preferred form of my invention, it will be understood that variations in details of form may be made without departure from the invention as defined in the appended claims.

I claim:

1. A trailer house dolly comprising spaced side frame members, said members being connected to each other at one end and spaced from each other at their opposite ends, hitch means attached to said members at said one end for connecting said dolly to a towing means, a shaft adapted for pivotal attachment about a transverse axis to the forward portion of a trailer frame extending through both of said frame members, said shaft being horizontally positioned and forming an A-shaped structure with said side frame members, said other end of said frame members being interconnected by a generally S-shaped member, said S-shaped member extending between said side frame members adjacent said other end of said side frame members, means connecting said S-shaped frame member to said side frame members for pivotal movement of said S-shaped frame member between said frame members about a horizontal axis only which is parallel to said shaft axis, said S-shaped member forming two spaced pockets, a wheel pivotally connected to said S-shaped member and received in one of said pockets, a second wheel pivotally connected to said S-shaped member and received in the second pocket of said S-shaped member, both said wheels being pivotal about horizontal axes only which are parallel to said shaft axis.

2. A trailer house dolly comprising a generally horizontally disposed A frame, means for pivotally connecting said frame to a trailer for pivotal movement about a horizontal axis extending transversely with respect to said frame and trailer, a hitch means connected to the apex of said frame and a wheel assembly interconnecting the legs of said A-shaped frame adjacent the end removed from said apex, said wheel assembly being connected to said frame for pivotal movement about a horizontal axis only which is parallel to said first named axis, the latter horizontal axis being disposed a greater distance from said apex than said means for pivotally connecting said frame to a trailer, and being substantially in the same horizontal plane of said dolly as the last named axis, said wheel assembly comprising a pair of wheels mounted for pivotal movement about a horizontal axis only which is parallel to said first named axis.

3. A trailer house dolly comprising spaced side frame members, said members being connected to each other at one end and spaced from each other at the opposite end, a shaft adapted for pivotal attachment about a transverse axis to the forward portion of a trailer frame extending horizontally through said members at approximately the mid point thereof, said shaft forming an A-shaped structure with said members, the other ends of said frame members being spaced apart, an S-shaped member positioned intermediate said other ends of said members, means pivotally connecting said S-shaped member to said side frame members for pivotal movement about a horizontal axis only which is parallel to said shaft axis, said horizontal axis being spaced a greater distance from said apex than said shaft and extending parallel to said shaft and substantially in the same horizontal plane of said frame as said shaft, said S-shaped member having two spaced pockets, one of said pockets opening outwardly laterally toward one side of said horizontal axis, the other of said pockets opening outwardly to the opposite side of said horizontal axis with said pockets lying in a common horizontal plane and being adjacent each other, a wheel received in one of said pockets, said wheel being pivotally connected to said S-shaped member for pivotal movement about an axis extending parallel to said shaft axis, the last named axis being longitudinally spaced to one side of the axis of pivotal connection of said S-shaped member to said side frame members, a second wheel received in the other of said pockets, said second wheel being pivotally connected to said S-shaped member for pivotal movement about an axis extending parallel to said shaft axis, the last named axis being spaced to the opposite side of said axis of pivotal connection of said S-shaped member to said side frame members.

References Cited in the file of this patent

UNITED STATES PATENTS

| | | |
|---|---|---|
| 2,157,998 | Callaway | May 9, 1939 |
| 2,244,510 | Anderson | June 3, 1941 |